F. B. ISETT.
BINDING ATTACHMENT FOR HARVESTERS.

No. 105,946. Patented Aug. 2, 1870.

Witnesses:
Inventor:

UNITED STATES PATENT OFFICE.

FRANKLIN B. ISETT, OF HOLLIDAYSBURG, PENNSYLVANIA.

IMPROVEMENT IN BINDING ATTACHMENTS FOR HARVESTERS.

Specification forming part of Letters Patent No. 105,946, dated August 2, 1870.

*To all whom it may concern:*

Be it known that I, FRANKLIN B. ISETT, of Hollidaysburg, in the county of Blair and State of Pennsylvania, have invented a new and Improved Grain-Deliverer; and I do hereby declare that the following is a full, clear, and exact description thereof, which will enable others skilled in the art to make and use the same, reference being had to the accompanying drawings, forming part of this specification.

This invention relates to improvements in grain-delivering attachments for reaping-machines; and consists in a combination, with a grain-receiving platform or apron, on which the cut grain falls or is delivered by a rake, of a pair of vibrating racks, a receiving and binding table, and certain operating gear for working the racks, so arranged that the said racks will automatically take the grain from the platform and deliver it on the table in gavels for binding, all as hereinafter more fully specified.

Figure 1:
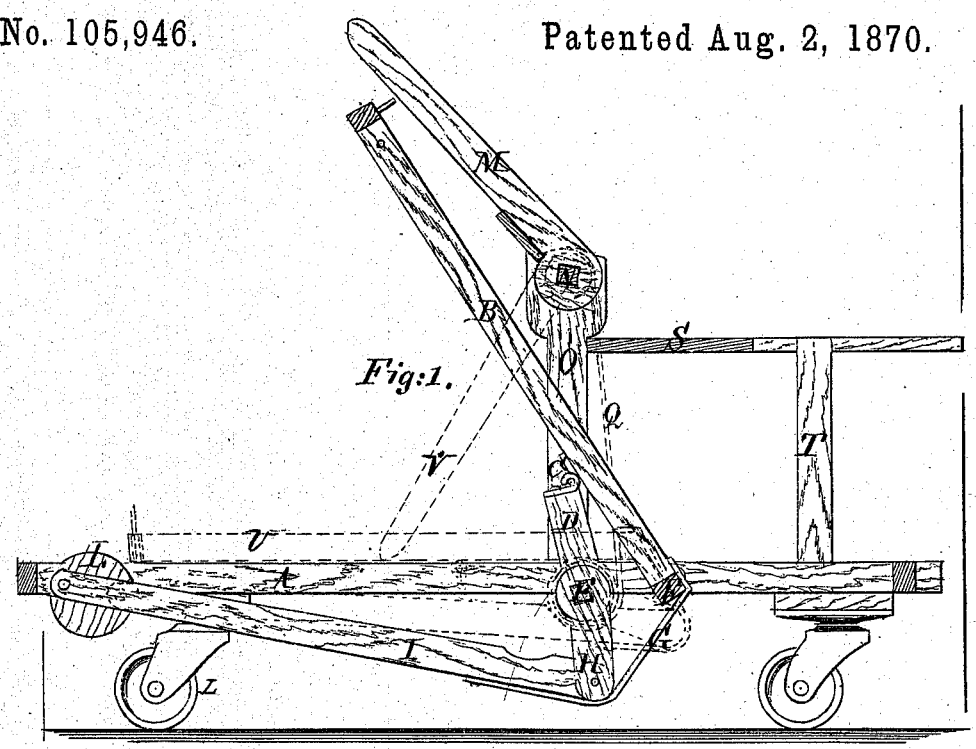
Figure 2:
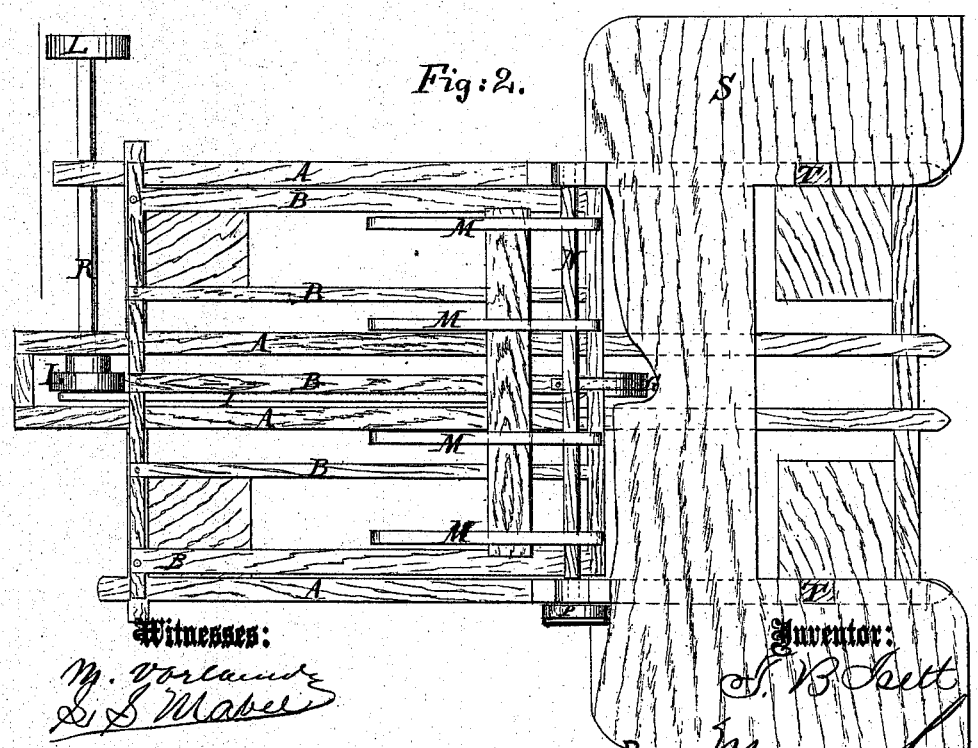

Figure 1 represents a longitudinal sectional elevation of my improved grain-delivering apparatus; and Fig. 2 is a plan view of the same.

Similar letters of reference indicate corresponding parts.

A is the platform for the support of the rack, which receives the grain from the apron or platform of a self-raking reaper, the gear or other connection of the deliverer with the same being such that the rack shall be in the horizontal position at the moment one of the arms of the reel or rake is completing its movement, by sweeping the grain (necessary to form a gavel) off the platform. B represents a delivering rack or frame, placed on the frame A, so as to receive the grain delivered on it. It is hinged at C to the ends of arms D, attached to the shaft E, mounted on the frame A transversely. The end F of this rack or frame is connected by a strap, cord, or chain, with the end of an arm, H, on the shaft E, and projecting from the side opposite to that on which the arms D are. I is a connecting-rod, connecting the arm H with the crank-shaft E, which is to be driven by any suitable connection with the operating parts of the reaper; but I prefer to connect the outer ends of the rod I eccentrically with one of the wheels L, while the outer one may be made large enough to roll on the ground, or may be rotated by a band connecting with the driving-gear. M represents another rack or frame. It is mounted on the shaft N, which is supported at some distance above the platform A by the posts O. This shaft carries a small pulley, P, to which a strap, Q, which winds on it, and also on a larger pulley on the crank-shaft E, is attached, so that when the latter is turned in one direction the said strap will wind up on it and turn the shaft N. Behind the posts O is the binding-table S, supported on the posts T, between which the binder stands.

The grain is received on the rack or frame B, when it is down in the position indicated by the dotted lines V, at which time the frame M is also in the position indicated by the dotted lines *u*. The rotation of the inner pulley L will then, through the connecting-rod I, turn the shaft E, and raise the frame B, and also carry it backward about the distance of the length of the arms D. The frame M will be carried up, also, at the same time, by the pulley on the end of the shaft E, belt Q, and the small wheel or pulley P, and, in consequence of the wheel P being made smaller than that on the crank-shaft, the said frame M will be caused to move farther than the frame B, thereby taking the grain from the latter, raising it higher than it could do, and tilting so far forward that the grain will slide off onto the table S, where the attendant receives and binds it; or it may be delivered to an automatic binding-machine.

Having thus described my invention, I claim as new and desire to secure by Letters Patent—

1. The combination, with a platform, A, of the lifting-frames B M, and a receiving-table, S, arranged for joint automatic action, all substantially as specified.

2. The combination, with the platform A and frame B, of the shaft E, arms D H, belt C, and connecting-rod I, all constructed and operating substantially as specified.

3. In combination with the shaft E and frame B, the pulley R, strap Q, frame M, shaft N, and pulley P, all constructed and operating substantially as specified.

FRANKLIN B. ISETT.

Witnesses:
A. MCALLISTER,
JOHN HALFPENY.